(12) United States Patent
Hong

(10) Patent No.: US 8,327,455 B2
(45) Date of Patent: Dec. 4, 2012

(54) APPARATUS AND METHOD FOR CONTROLLING COPYING OF AV DATA AND COMPUTER READABLE MEDIUM THEREFOR

(75) Inventor: Seung-se Hong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 961 days.

(21) Appl. No.: 11/699,383

(22) Filed: Jan. 30, 2007

(65) Prior Publication Data

US 2007/0192787 A1 Aug. 16, 2007

(30) Foreign Application Priority Data

Feb. 15, 2006 (KR) .................. 10-2006-0014729
Oct. 12, 2006 (KR) .................. 10-2006-0099421

(51) Int. Cl.
*G06F 21/00* (2006.01)
(52) U.S. Cl. ................. 726/27; 726/32; 380/203
(58) Field of Classification Search .............. 725/25
See application file for complete search history.

(56) References Cited

U.S. PATENT DOCUMENTS

| | | | |
|---|---|---|---|
| 5,418,853 A * | 5/1995 | Kanota et al. ........... | 380/203 |
| 5,574,787 A * | 11/1996 | Ryan ....................... | 380/201 |
| 5,778,064 A * | 7/1998 | Kori et al. ................ | 380/203 |
| 7,634,090 B2 * | 12/2009 | Kobayashi ............... | 380/201 |
| 2001/0033739 A1 * | 10/2001 | Oguro et al. ............. | 386/94 |
| 2003/0142959 A1 * | 7/2003 | Qu ........................... | 386/94 |
| 2004/0125953 A1 * | 7/2004 | Cho et al. ................ | 380/203 |

FOREIGN PATENT DOCUMENTS

| | | | |
|---|---|---|---|
| KR | 10-2004-0042001 A | 5/2004 | |
| WO | 2004/059970 A1 | 7/2004 | |

OTHER PUBLICATIONS

Digital Visual Interface DVI, Apr. 2, 1999, pp. 1-76, XP55007672, URL: http://www.ddwg.org/lib/dvi_10.pdf.
IBM et al., Content Protection for Prerecorded Media Specification, CPPM Specification: DVD Book, Revision 0.93, Jan. 31, 2001, pp. 1-21, XP002591552, URL: http://www.4centity.com/docs/Doc_Request_Form/cppm-dvd093.pdf.
Digital Content Protection LLC, High-bandwidth Digital Content Protection System 1.1, Internet citation, Jun. 9, 2003, pp. 1-85, XP002517268, URL: http://www.digital-cp.com/files/static_page_files/D672E3A3-EF28-151F-63A2522CCC29DAF1/HDCPSpecficationRev1_1.pdf.
HDMI, Wikipedia.org, Feb. 14, 2006, pp. 1-4, XP55007723, URL: http://en.wikipedia.org/w/index.php?title=HDMI&oldid=39530677.

* cited by examiner

*Primary Examiner* — Gilberto Barron, Jr.
*Assistant Examiner* — David Le
(74) *Attorney, Agent, or Firm* — Jefferson IP Law, LLP

(57) ABSTRACT

Computer readable media, apparatuses, and methods to control copying of AV data are provided. The data structure includes the AV data having a format according to a protocol for a digital channel between a transmission device and a reception device, and copy control information to control copying of the AV data. Accordingly, copy control can be performed for a digital signal received and decoded according to a DVI or HDMI protocol. In addition, when the digital signal is converted to an analog signal, a CGMS and Macrovision signal can be inserted into the analog signal.

20 Claims, 10 Drawing Sheets

FIG. 3

| Packet Byte# | 7 | 6 | 5 | 4 | 3 | 2 | 1 | 0 |
|---|---|---|---|---|---|---|---|---|
| SVCP TYPE CODE | HB0 | Packet Type=0x86 | | | | | | |
| SVCP Version Number | HB1 | Version=0x01 | | | | | | |
| Length of SVCP | HB3 | Length=0x02 | | | | | | |
| Data Byte 0 | PB0 | 312 ⌐ 314 ⌐ 316 ⌐ 318 Checksum | | | | | | |
| Data Byte 1 (310) | PB1 | Rsvd(0) | | A1 | A0 | | C1 | C0 |
| Data Byte 2 (320) | PB2 | | | | ASB | 322 | APS1 | APS0 |
| n. a. | PB3~PB5 | Reserved(0) | | | | | 324 | 326 |

FIG. 4A

| BIT 1<br>C1 | BIT 0<br>C0 | FUNCTION |
|---|---|---|
| 0 | 0 | COPY ALLOWED |
| 0 | 1 | Not Use |
| 1 | 0 | COPY ALLOWED ONLY ONCE |
| 1 | 1 | COPY NOT ALLOWED |

FIG. 4B

| BIT | DESCRIPTION | FUNCTION |
|---|---|---|
| BIT 4<br>A0 | TRANSMISSION ASPECT RATIO | 4:3 IF A0=0 |
| | | 16:9 IF A0=1 |
| BIT 5<br>A1 | SCREEN DISPLAY FORMAT | NORMAL IF A1=0 |
| | | LETTER BOX IF A1=1 |

APPARATUS AND METHOD FOR CONTROLLING COPYING OF AV DATA AND COMPUTER READABLE MEDIUM THEREFOR

CROSS-REFERENCE TO RELATED APPLICATIONS

This application claims the benefit of Korean Patent Applications No. 2006-14729, filed on Feb. 15, 2006, and Korean Patent Application No. 2006-99421, filed on Oct. 12, 2006, in the Korean Intellectual Property Office, the disclosures of which are incorporated herein by reference.

BACKGROUND OF THE INVENTION

1. Field of the Invention

Aspects of the present invention relate to copy control of Audio-Video (AV) data, and more particularly, to an apparatus, method, and computer readable medium for preventing illegal copying of AV data in a device using a digital channel, a media transmission device, and a media reception device, which have a copy control function using the data structure, and a method to control copying of AV data.

2. Description of the Related Art

When a digital media reproduction device (source device) transmits Audio-Video (AV) data to a display or recording device (sink device), a Digital Video Interface (DVI) or High Definition Multimedia Interface (HDMI) protocol, which is a protocol for transmitting a pure digital signal in which no analog signal is included between the devices, has been widely used. The DVI or HDMI protocol protects content using High-bandwidth Digital Content Protection (HDCP), which is an encryption technique made by Intel. HDCP prevents illegal copying of data and leakage of data to a third device by encrypting and decrypting AV data transmitted from a source device to a sink device.

Thus, in order to transmit an image to a projector from an HDCP Digital Versatile Disc (DVD) player using a DVI or HDMI connection, an HDCP module must be installed in the projector. In addition, in order to simultaneously transmit the same content to two projectors, an HDCP module must be installed in a DVI or HDMI distribution amplifier.

FIG. 1 is a block diagram of a High Definition Multimedia Interface (HDMI) source device 110 and an HDMI sink device 120 according to the related art. The HDMI source device 110 is a reproduction device such as a digital set-top box or DVD player.

The HDMI source device 110 transmits AV data generated by passing through a video processor 112 and a video scaler 114 to the HDMI sink device 120 through an HDMI TX 116, which is a signal transmitter. The HDMI TX 116 transforms an AV signal to an HDMI Transition Minimized Differential Signaling (TMDS) format. The HDMI TX 116 includes an HDCP scrambler (not shown) encrypting the AV data and transmits the encrypted data through an HDMI interface (not shown), which is a digital channel.

The HDMI sink device 120 records or outputs the received AV data to a hard disk drive (HDD), a DVD-R, a Blu-ray Recordable Disc (BD-R), or a display device. The HDMI sink device 120 includes an HDMI RX 122, which is a signal receiver. The HDMI RX 122 transforms data of the HDMI TMDS format to a general AV signal, receives a digital signal from the HDMI source device 110; and performs an HDCP authentication process decrypting the received signal. If the HDCP authentication process fails, the encrypted data cannot be decrypted, and thus, a normal image cannot be viewed. For the HDCP authentication process, it must be determined whether response values $R_0$ and $R_0'$ are the same between the HDMI TX 116 and the HDMI RX 122 by comparing them to each other. A key value for decryption, called a Key Selection Vector (KSV), is exchanged between the two HDMI devices 110 and 120 to obtain $R_0$ and $R_0'$. The HDCP authentication process does not occur once but is repeated every several milliseconds while viewing video, and if $R_0$ and $R_0'$ are not the same between the two HDMI devices 110 and 120, no image can be viewed, and thereby content is protected.

The AV data output, after successfully passing through the HDCP authentication process in the HDMI RX 122, is displayed or recorded after being input to a digital video processor 124 or after being input to a digital-to-analog (D/A) converter 126 and converted to an analog signal. That is, in a section 130 before the AV data is input to the D/A converter 126, the AV data exists as a digital signal, and in a section 140 after the AV data is input to the D/A converter 126, the AV data exists as an analog signal.

Even though the DVI or HDMI protocol protects content using the HDCP as described above, since there exists no limitation for copying AV data after the HDCP authentication process and the decryption process are successfully completed by a recording device operating as an HDMI sink device, illegal copies can be made after the process completes. In addition, when a decrypted HDMI signal is converted to an analog signal, the analog signal cannot be protected from illegal copies. That is, in FIG. 1, a technique to control copying of a digital signal passing through the HDMI RX 122 is required.

SUMMARY OF THE INVENTION

Aspects of the present invention provide a computer readable medium comprising computer-executable instructions for controlling the copying of AV data, an authentication process which is successfully completed according to a protocol for a digital channel, and an apparatus and method for controlling copying using the instructions.

According to an aspect of the present invention, there is provided a computer readable medium comprising: AV data having a format according to a protocol for a digital channel between a transmission device and a reception device; and copy control information to controlling the copying of AV data.

According to another aspect of the present invention, the copy control information may comprise information to control copying of a digital signal output after the reception device receiving the AV data successfully performs an authentication process of the AV data according to the protocol for the digital channel.

According to another aspect of the present invention, the copy control information may comprise information to generating a copy control signal to be inserted into an analog signal when a digital signal is converted to the analog signal, wherein the digital signal is output after the reception device receiving the AV data successfully performs an authentication process of the AV data according to the protocol for the digital channel. The copy control signal to be inserted into the analog signal may be a signal according to a Copy Generation Management System (CGMS) protocol and/or a Macrovision protocol.

According to another aspect of the present invention, the AV data may have a format according to a High Definition Multimedia Interface (HDMI) protocol. The copy control information may be inserted into a data island period of the AV data.

According to another aspect of the present invention, the AV data may have a format according to a Digital Video Interface (DVI) protocol.

According to another aspect of the present invention, there is provided a method of controlling the copying of AV data in a transmission device comprising: generating a digital signal comprising the AV data according to a protocol for the digital channel; inserting information for controlling the copying of the AV data into the generated digital signal; and transmitting the AV data to a reception device through a digital channel.

According to another aspect of the present invention, there is provided a method of controlling the copying of AV data in a reception device comprising: receiving a digital signal from a reception device via a digital channel comprising AV data according to a protocol for the digital channel; performing an authentication process of the received digital signal according to the protocol for the digital channel; extracting copy control information stored in a predetermined register as a result of the authentication process; and controlling the copying of the AV data by referring to the extracted copy control information.

According to another aspect of the present invention, the controlling of the copying of the AV data may comprise generating a copy control signal by referring to the extracted copy control when the AV data is converted to an analog signal and inserting the generated copy control signal into the analog signal. The generating and inserting of the copy control signal may comprise generating a signal according to a Copy Generation Management System (CGMS) protocol and/or a Macrovision protocol and inserting the generated signal into the analog signal.

According to another aspect of the present invention, there is provided a transmission device comprising a signal transmitter to transmit AV data to a reception device through a digital channel, a microprocessor to direct the signal transmitter to insert copy control information to control copying of the AV data into a digital signal generated according to a protocol for the digital channel and to transmit the digital signal.

According to another aspect of the present invention, there is provided a reception device comprising a signal receiver to receive a digital signal comprising AV data from a transmission device through a digital channel and performing an authentication process of the received digital signal; a microprocessor to control copying of the AV data by extracting copy control information stored in a predetermined register as a result of the authentication process and referring to the extracted copy control information.

According to another aspect of the present invention, the reception device may further comprise a digital-to-analog (D/A) converter to convert the AV data output as a result of the authentication process to an analog signal, wherein the microprocessor generates a copy control signal for the analog signal by referring to the copy control information and directs the D/A converter to insert the copy control signal into the converted analog signal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 illustrates a data structure of copy control information according to another embodiment of the present invention;

FIGS. 4A and 4B illustrate the contents of a data byte1 of the copy control information illustrated in FIG. 3;

DETAILED DESCRIPTION OF THE EMBODIMENTS

Figure 1:
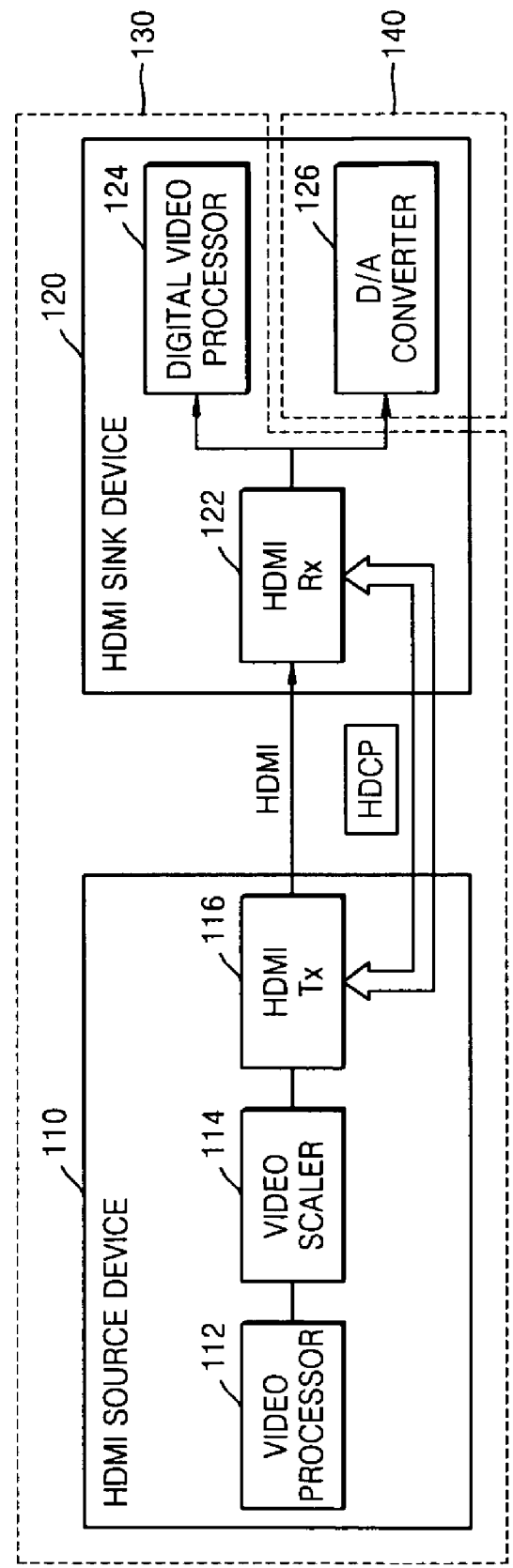
FIG. 1 is a block diagram of a High Definition Multimedia Interface (HDMI) source device and an HDMI sink device according to the related art.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
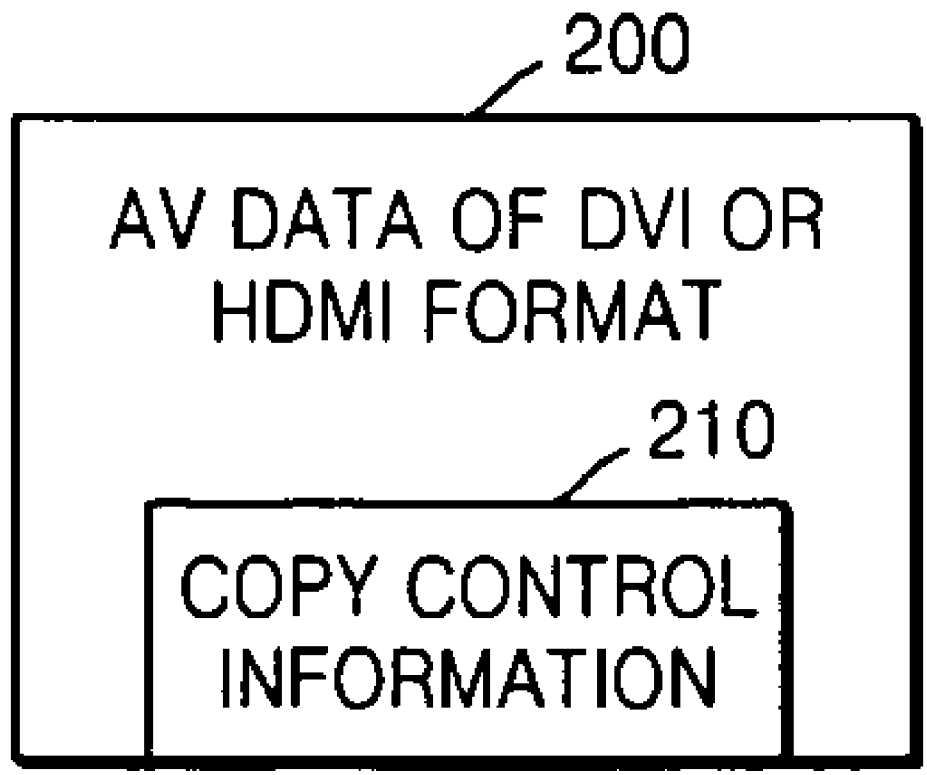
FIG. 2 is a conceptual diagram illustrating a data structure to control the copying of AV data according to an embodiment of the present invention.

FIG. 2 is a conceptual diagram illustrating a data structure to control copying of Audio-Video (AV) data according to an embodiment of the present invention.

Referring to FIG. 2, an information storage medium including data according to an embodiment of the present invention includes AV data 200 having a format according to a protocol for a digital channel between a transmission device, which is a source device, and a reception device, which is a sink device, and copy control information 210 to control copying of the AV data 200. The AV data 200 may be data generated in a Digital Video Interface (DVI) or High Definition Multimedia Interface (HDMI) format. The copy control information 210 is information to control copying of a digital signal output after a signal receiver of the sink device receiving the AV data 200 successfully performs an authentication process of the AV data 200 according to the protocol for the digital channel and is used to generate a copy control signal to be inserted into an analog signal when the digital signal output from the signal receiver is converted to the analog signal. In addition, the copy control information 210 may be inserted as a portion of the DVI or HDMI format so that the data structure is compatible with the DVI or HDMI format. For example, the copy control information 210 can be inserted into a data island period of the HDMI protocol. Other aspects of the present invention may insert the copy control information 210 into any video format, such as an MPEG format.

FIG. 3 illustrates a data structure of copy control information according to another embodiment of the present invention, e.g., a structure of a Samsung Video Content Protection (SVCP) packet inserted into a digital signal transmitted according to the HDMI protocol. When recording or D/A conversion is performed using a digital signal input through the HDMI RX described above, copy control information included in the SVCP packet must be observed.

Referring to FIG. 3, the SVCP packet has 9 bytes. The copy control information is recorded in a data byte1 (Data Byte 1) 310 and a data byte2 (Data Byte 2) 320. Type information (SVCP TYPE CODE), version information (SVCP Version Number), a packet length (Length of SVCP), checksum information (Data Byte 0), and other information are recorded in the other areas.

A predetermined type code is recorded in an 'SVCP TYPE CODE' field, and 1 is recorded in an 'SVCP Version Number' field. If a version is modified in the future, an increased number may be recorded in the 'SVCP Version Number' field. The number of data bytes of the SVCP packet is recorded in a 'Length of SVCP' field, and a checksum value is recorded in a 'Data Byte 0' field. The checksum value is determined so that 0 is obtained when the checksum value is subtracted from a value obtained by summing all bytes including the 'SVCP TYPE CODE' field. Information on Copy Generation Management System (CGMS) and a picture ratio is recorded in a 'Data Byte 1' field, and an Analog Protection System (APS) 324 and 326 and an Analog Source Bit (ASB) 322 may be recorded in a 'Data Byte 2' field, depending on the technology used. Third through fifth data bytes are reserved.

The copy control information recorded in the data byte1 310 and the data byte2 320 is used to control copy of a digital signal output from a signal receiver of a sink device. Alternatively, the copy control information can be used to generate a copy control signal for an analog signal when the sink device converts the digital signal to an analog signal. For example, the copy control information may be used to generate a signal according to a CGMS protocol and/or a Macrovision protocol. The CGMS protocol defines information on whether copying of analog content is allowed. Whether copying of a video signal is allowed, allowed only once, or not allowed is determined by inserting a CGMS signal into $20^{th}$ and $283^{rd}$ lines in the National Television System Committee (NTSC) format or a $43^{rd}$ progressive line in the Phase Alternation Line (PAL) format. In addition, Macrovision, which is a copy prevention technique, is performed according to the CGMS signal. The Macrovision technology adds a series of electronic pulses to a video signal, whereby an original video tape can be normally reproduced while image quality of a copied video tape is significantly degraded. Other aspects of the present invention may use other protocols or formats.

FIGS. 4A and 4B illustrate the contents of the data byte1 310 of the copy control information illustrated in FIG. 3.

Referring to FIG. 4A, whether copying is allowed is recorded in bit1 316 and bit0 318 of the data byte1 310. That is, information on whether copying is allowed, allowed only once, or not allowed is recorded. Referring to FIG. 4B, a picture ratio and a screen display format are recorded in bit4 314 and bit5 312 of the data byte1 310, respectively.

Figure 5A:
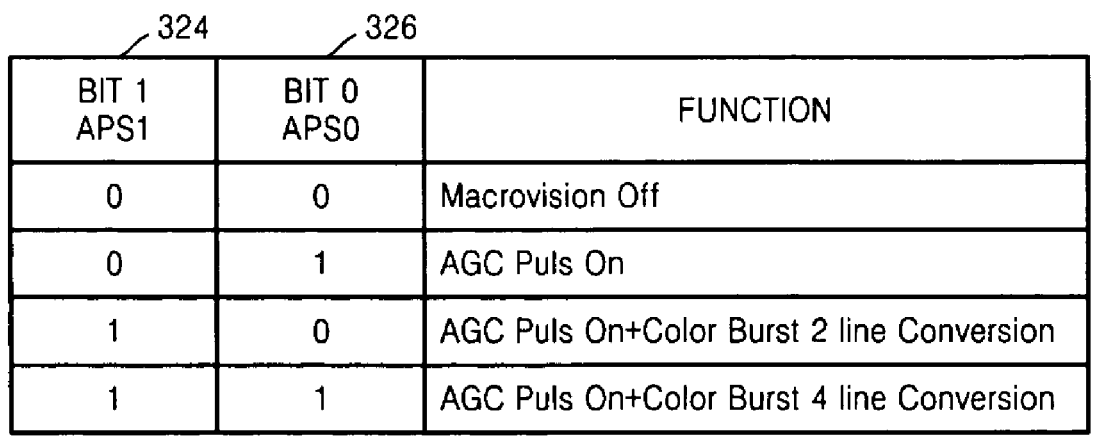
FIGS. 5A and 5B illustrate the contents of a data byte2 of the copy control information illustrated in FIG. 3.
Figure 5B:
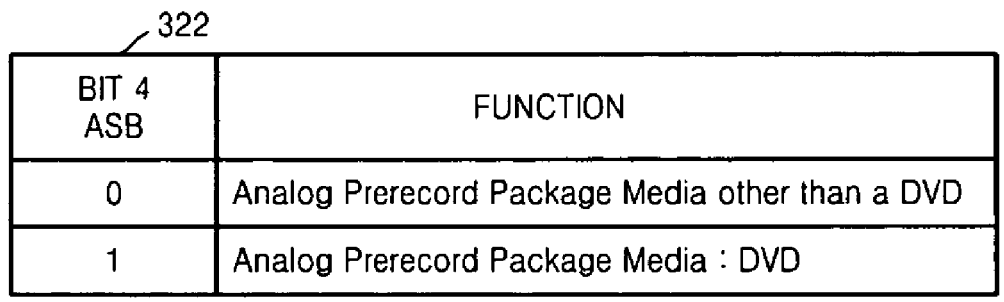

FIGS. 5A and 5B illustrate the contents of the data byte2 320 of the copy control information illustrated in FIG. 3.

Referring to FIG. 5A, four types of Macrovision information is recorded in bit1 324 and bit0 326 of the data byte2 320. Referring to FIG. 5B, whether an analog prerecorded package medium is a Digital Versatile Disc (DVD) is recorded in bit4 322 of the data byte2 320. The bit1 324, bit0 326, and bit4 322 of the data byte2 320 are used to generate a Macrovision signal. Other aspects of the present invention, which might not use Macrovision technology, may use these areas for other purposes.

A transmission device and a reception device according to embodiments of the present invention may have a similar configuration of conventional devices and may be connected to each other using a DVI, HDMI, or other cable supporting a protocol for a digital channel. However, the two devices are different from the conventional devices in that a microprocessor or micro controller of the two devices processes the copy control information according to various embodiments of the present invention. Thus, the data structure of AV data according to various embodiments of the present invention has full compatibility since it can be used in conventional devices.

Figure 6:
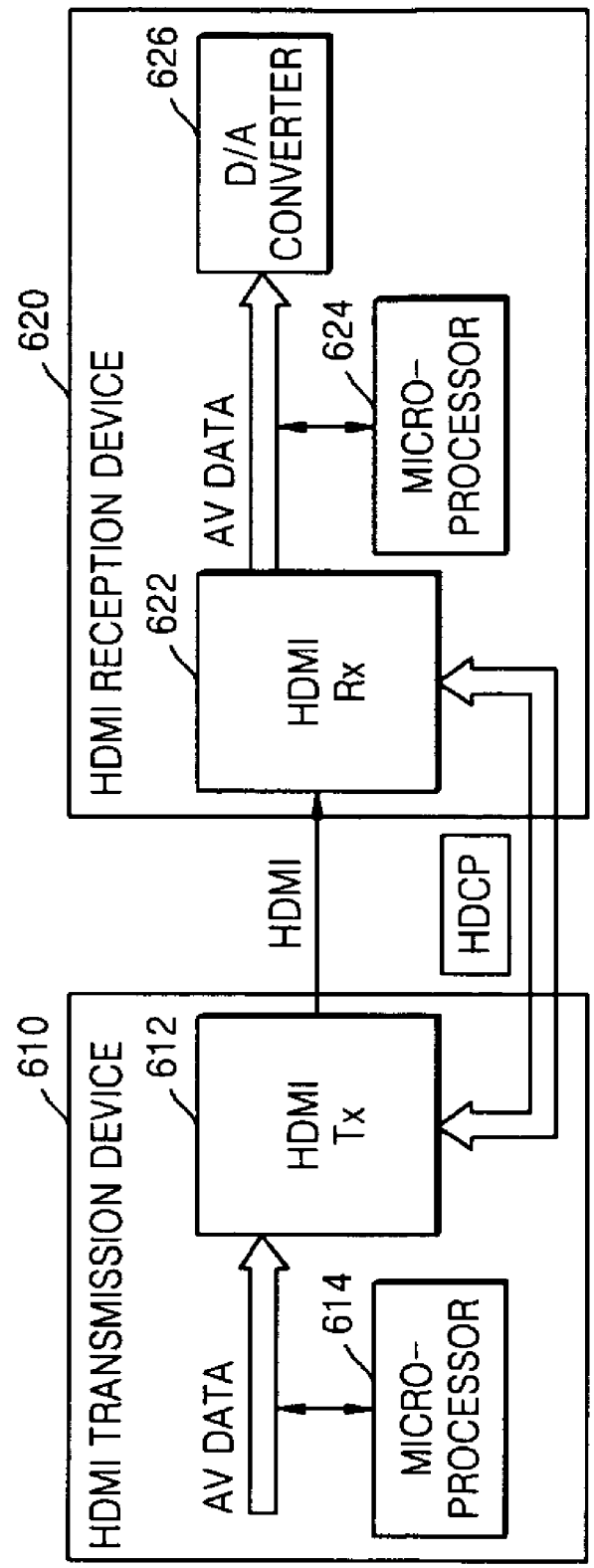
FIG. 6 is a block diagram of a transmission device and a reception device for controlling the copying of AV data according to an embodiment of the present invention.

FIG. 6 is a block diagram of a transmission device and a reception device, which support HDMI, to control copying of AV data according to an embodiment of the present invention.

An HDMI transmission device 610 includes an HDMI signal transmitter 612 transmitting AV data to an HDMI reception device 620 through a digital channel. A microprocessor 614 directs the HDMI signal transmitter 612 to insert copy control information to control copying of AV data into a digital signal generated according to a protocol for the digital channel and to transmit the digital signal. The copy control information can be inserted into a data island period, or other portion of the AV signal, depending on the format of the AV signal.

An HDMI transmission device 610 includes an HDMI signal transmitter 612 transmitting AV data to an HDMI reception device 620 through a digital channel. A microprocessor 614 directs the HDMI signal transmitter 612 to insert copy control information to control copying of AV data into a digital signal generated according to a protocol for the digital channel and to transmit the digital signal. The copy control information can be inserted into a data island period, or other portion of the AV signal, depending on the format of the AV signal.

The HDMI reception device 620 includes an HDMI signal receiver 622 to receive a digital signal comprising the AV data from the HDMI transmission device 610 through the digital channel and to perform an authentication process of the received digital signal according to the protocol for the digital channel. Since the copy control information inserted in the HDMI signal is recorded in a predetermined register (not shown) by the HDMI signal receiver 622, a microprocessor 624 of the HDMI reception device 620, which is a sink device, loads information regarding the register into a memory (not shown) and controls copying of the AV data by referring to the loaded information. A predetermined one (e.g., InfoFrame) of registers of the HDMI signal receiver 622 can be used as the register to store the copy control information.

Alternatively, a D/A converter 626 may be further included to convert AV data output as a result of the authentication process to an analog signal. In this case, the microprocessor 624 generates a copy control signal for the analog signal by referring to the extracted copy control information and instructs the D/A converter 626 to insert the copy control signal into the analog signal.

Figure 7:
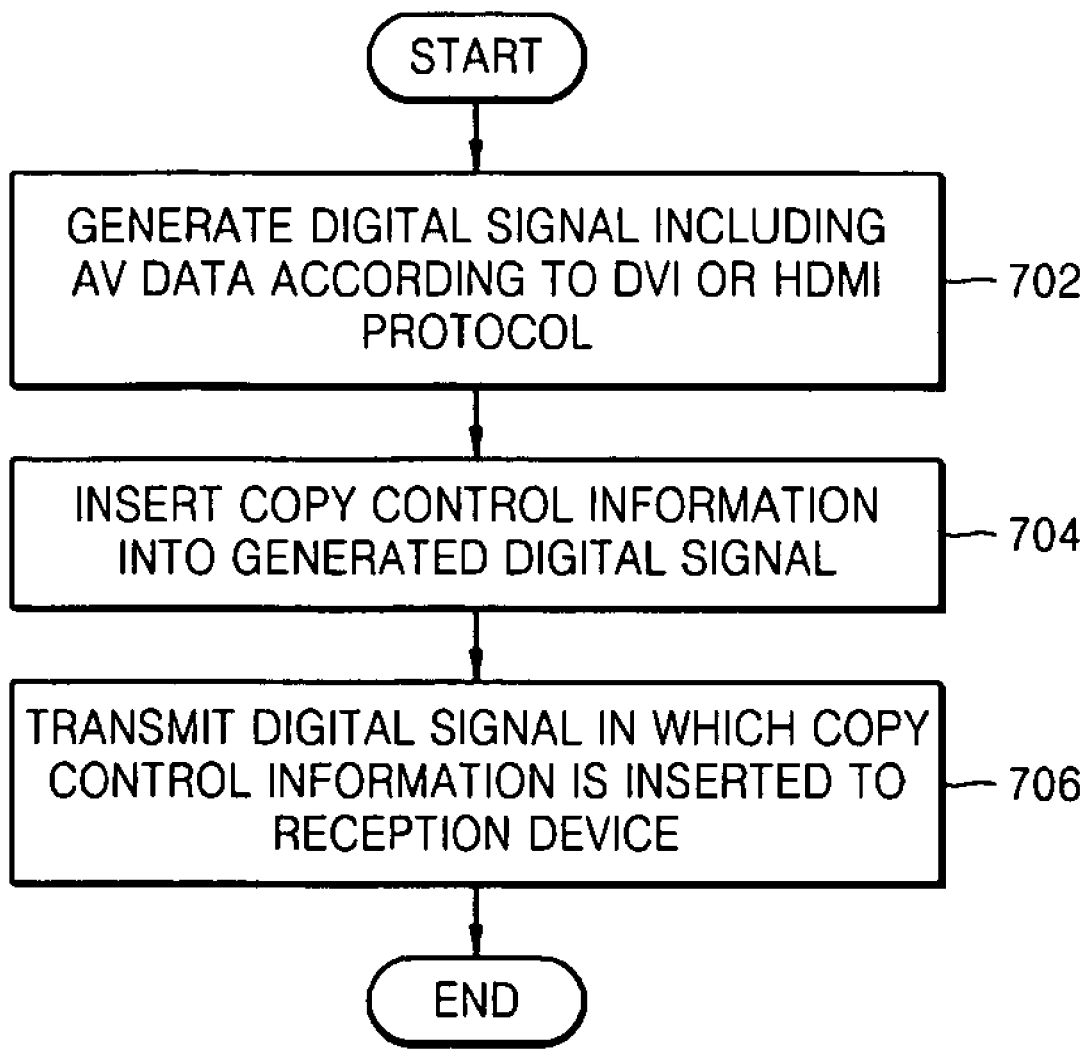
FIG. 7 is a flowchart illustrating a copy control method of a transmission device according to an embodiment of the present invention.

FIG. 7 is a flowchart illustrating a copy control method of a transmission device according to an embodiment of the present invention.

The transmission device generates a digital signal including AV data according to the DVI or HDMI protocol in operation 702. The transmission device inserts information to control copying of AV data into the generated digital signal in operation 704. The inserted copy control information is information independent from a data structure or authentication information defined in a protocol for a digital channel, such as the DVI or HDMI protocol, and is used to control post copying of AV data decoded according to the protocol. The digital signal in which the copy control information is inserted is transmitted to a reception device, which is a sink device, in operation 706 and reproduced or copied to a recording medium or output to a display device.

Figure 8:
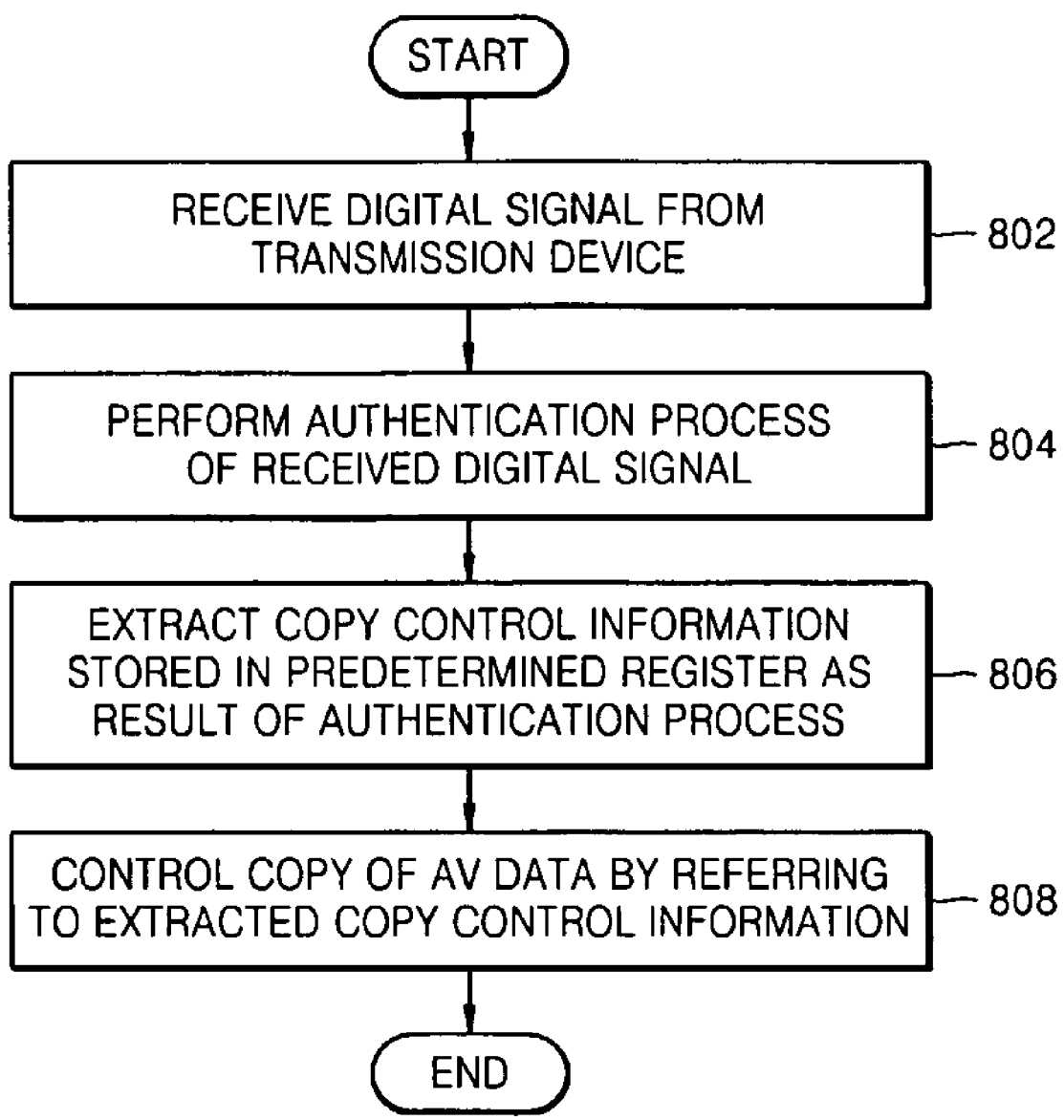
FIG. 8 is a flowchart illustrating a copy control method of a reception device according to an embodiment of the present invention.

FIG. 8 is a flowchart illustrating a copy control method of a reception device according to an embodiment of the present invention.

The reception device receives a digital signal including AV data from a transmission device, which is a source device, in operation 802. The received digital signal is decoded in operation 804 by an HDMI RX performing an authentication process according to a protocol for a digital channel. Since copy control information inserted in the HDMI signal by the transmission device is stored in a predetermined register according to the HDMI protocol, the copy control information is extracted from the register in operation 806. Copying of the AV data is controlled in operation 808 by referring to the extracted copy control information. When the AV data is converted to an analog signal and recorded, a copy control signal for CGMS and Macrovision, if these technologies are used, is generated by referring to the copy control information and inserted into the analog signal. Other aspects of the invention may use other analog signal copy control techniques.

Figure 9:
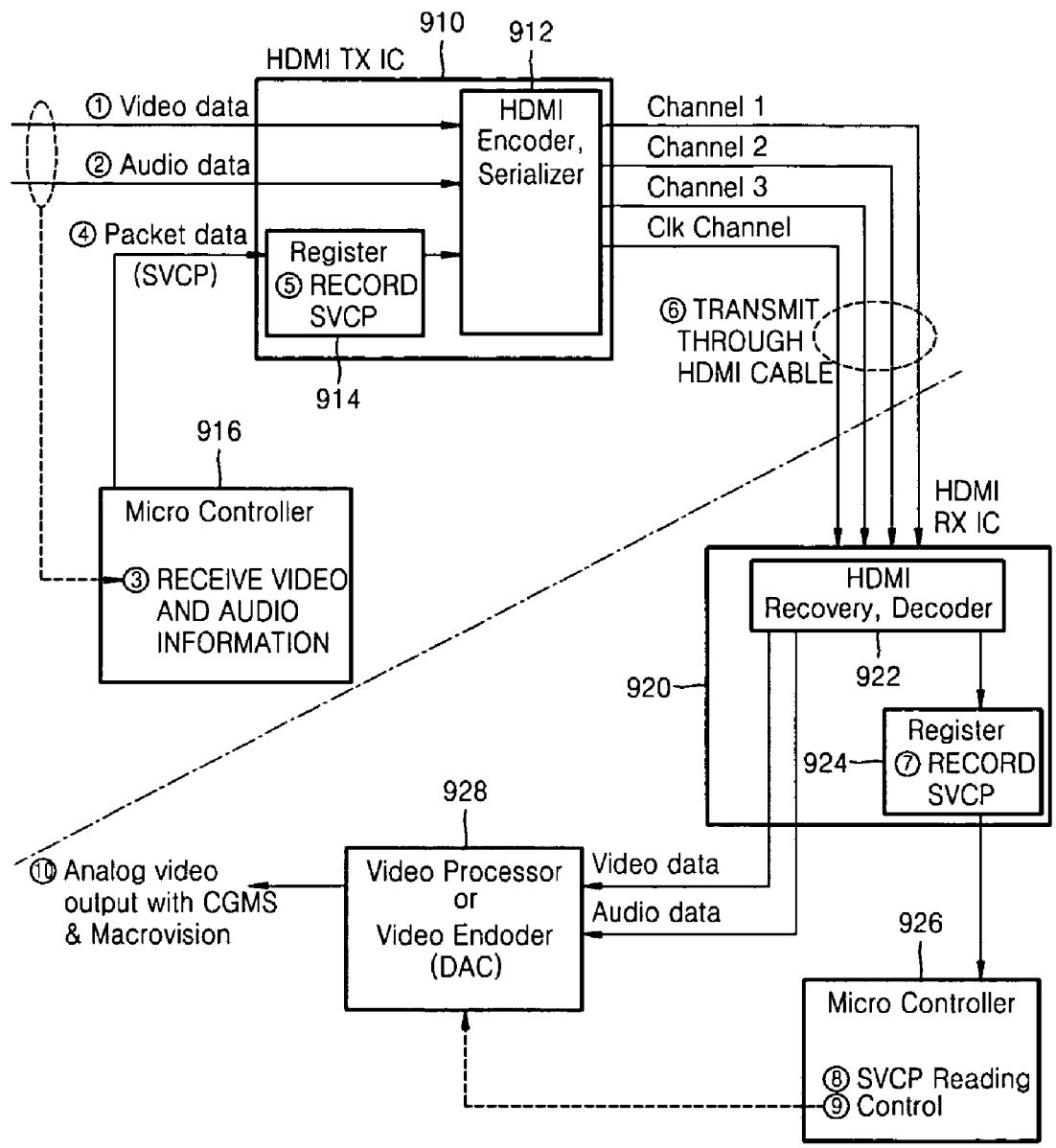
FIG. 9 is a signaling diagram for describing operations of a transmission device and a reception device for controlling the copying of AV data according to an embodiment of the present invention.

FIG. 9 is a signaling diagram for describing operations of a transmission device and a reception device to control copy of AV data according to an embodiment of the present invention.

A video signal and an audio signal are input from an AV device, such as a DVD player or set-top box, to an HDMI TX Integrated Circuit (IC) 910 in operations 1 and 2. CGMS information of the video signal is previously decoded by a Moving Picture Experts Group (MPEG) IC and transmitted to a micro controller 916 in operation 3. The micro controller 916 generates SVCP packet data by referring to the CGMS information and records the generated SVCP packet data in a register 914 in operations 4 and 5. An encoder/serializer 912 of an HDMI TX IC 910 converts the input video data, audio data, and SVCP packet data to a signal of a TMDS (Transition Minimized Differential Signaling) format and outputs the TMDS signal through an HDMI cable in operation 6. The SVCP packet data may be carried on a data island period of a first channel.

The TMDS signal transmitted through the HDMI cable is divided into a plurality of signals by a decoder 922 of an HDMI RX IC 920. The SVCP packet data contained in the divided signals is recorded in a register 924 in operation 7. The video data and the audio data contained in the divided signals are input to a video processor or video encoder 928. A micro controller 926 reads the SVCP packet data from the register 924 in operation 8 and, in operation 9, performs copy control by referring to the read data or inserts CGMS and Macrovision pulses into an analog video signal output from the video encoder 928 in operation 10, if CGMS or Macrovision technology is being used.

Figure 10:
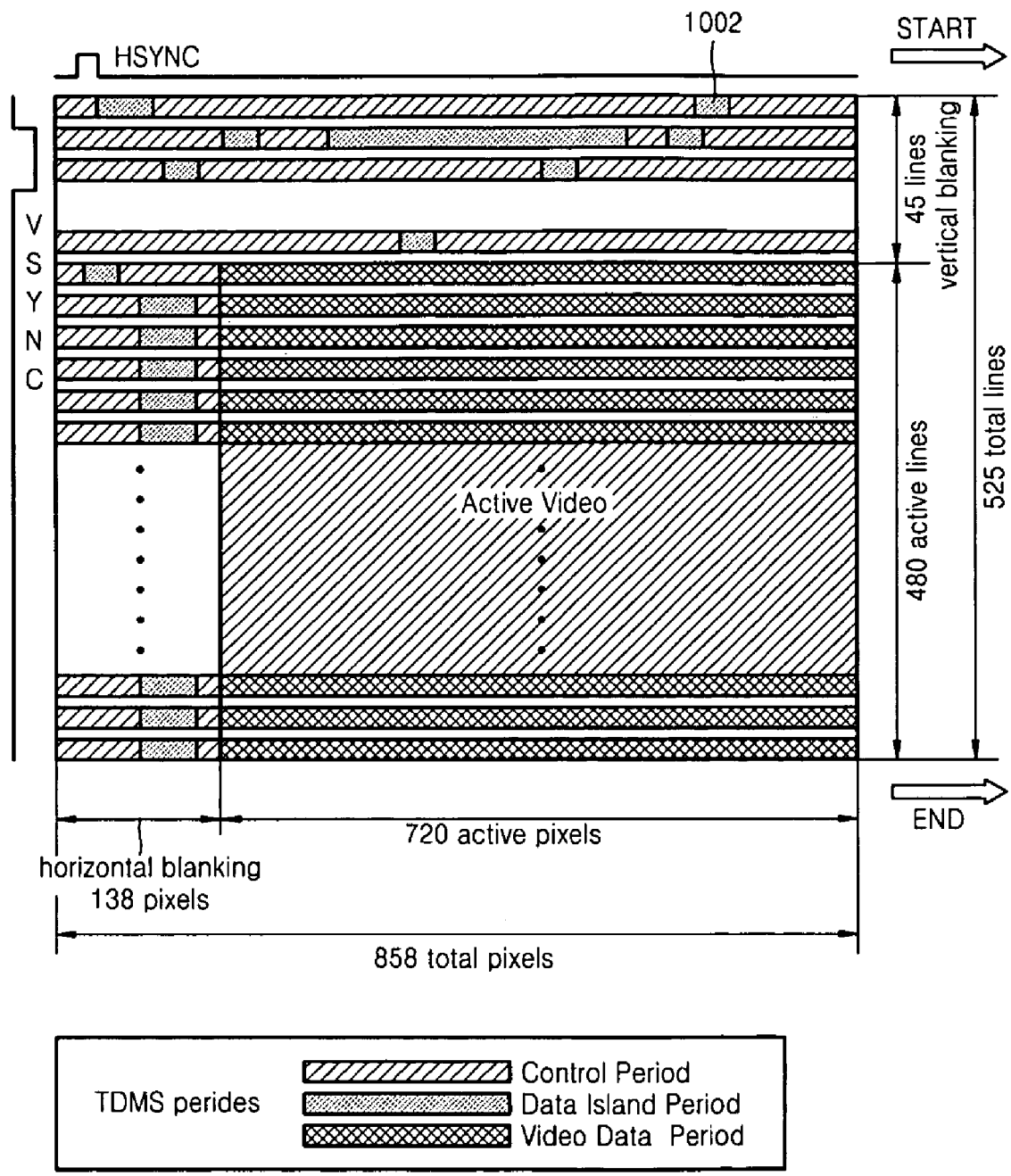
FIG. 10 illustrates a signal structure of AV data according to an embodiment of the present invention.

FIG. 10 illustrates a signal structure of AV data according to an embodiment of the present invention, e.g., a structure of a digital signal transmitted through an HDMI cable. A data island period 1002 exists in an available space except in a video data period, and various kinds of packet data are inserted into the data island period and transmitted. An SVCP data packet according to an embodiment of the present invention can also be carried on the data island period 1002.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

As described above, according to the present invention, copy control can be performed for a digital signal received and decoded according to a DVI or HDMI protocol.

In addition, when the digital signal is converted to an analog signal, a CGMS, Macrovision signal, and/or other analog copy control signals can be inserted into the analog signal.

In addition, a data structure of AV data may be compatible with the DVI, HDMI, or other protocol.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A non-transitory computer readable medium comprising:
   AV data having a format according to a protocol for a digital channel between a transmission device and a reception device, the AV data comprising authentication information defined in the protocol for the digital channel, the authentication information being used for a digital copy control scheme; and
   copy control information to control copying of the AV data, the copy control information specifying an analog copy control scheme to be applied to an analog signal including the AV data when the analog signal is decoded from a digital signal including the AV data after the digital copy control scheme is applied to the digital signal.

2. The non-transitory computer readable medium according to claim 1, wherein:
   the digital signal is output after the reception device receiving the AV data successfully performs an authentication process of the AV data using the authentication information according to the protocol for the digital channel.

3. The non-transitory computer readable medium according to claim 2, wherein the copy control signal to be inserted into the analog signal is a signal according to a Copy Generation Management System (CGMS) protocol and/or a Macrovision protocol.

4. The non-transitory computer readable medium according to claim 1, wherein the AV data has a format according to a High Definition Multimedia Interface (HDMI) protocol.

5. The non-transitory computer readable medium according to claim 4, wherein the copy control information is inserted into a data island period of the AV data.

6. The non-transitory computer readable medium according to claim 1, wherein the AV data has a format according to a Digital Video Interface (DVI) protocol.

7. A method of controlling the copying of Audio-Video (AV) data in a transmission device, the method comprising:
   generating a digital signal comprising the AV data according to a protocol for a digital channel, the AV data comprising authentication information defined in the protocol for the digital channel, and the authentication information being used for a digital copy control scheme;

inserting information for controlling the copying of the AV data into the generated digital signal, the information specifying an analog copy control scheme to be applied to an analog signal into which the digital signal is converted, after the digital copy control scheme is applied to the digital signal in a reception device;

transmitting the digital signal to the reception device through the digital channel.

8. The method of claim 7, wherein the digital channel is a digital interface according to a High Definition Multimedia Interface (HDMI) protocol.

9. The method of claim 8, wherein the inserting of the copy control information comprises inserting the information for controlling the copying of the AV data into a data island period according to the HDMI protocol.

10. The method of claim 7, wherein the digital channel is a digital interface according to a Digital Video Interface (DVI) protocol.

11. A method of controlling the copying of AV data in a reception device, the method comprising:

receiving via a digital channel a digital signal according to a protocol for the digital channel, wherein the digital signal comprises AV data and the AV data comprises authentication information defined in the protocol for the digital channel, the authentication information being used for a digital copy control scheme;

performing an authentication process of the received digital signal according to the protocol for the digital channel using the authentication information;

converting the digital signal into an analog signal when the authentication process is successfully performed;

extracting copy control information stored in a predetermined register as a result of the authentication process, the copy control information being independent of the protocol for the digital channel;

generating a copy control signal according to an analog copy control scheme based on the copy control information; and applying the copy control signal to the analog signal.

12. The method of claim 11, wherein the generating and inserting of the copy control signal comprises:

generating a signal according to a Copy Generation Management System (CGMS) protocol and/or a Macrovision protocol; and inserting the generated signal into the analog signal.

13. A transmission device comprising:

a signal transmitter to transmit AV data to a reception device through a digital channel;

a microprocessor to direct the signal transmitter to insert copy control information to control copying of the AV data into a digital signal generated according to a protocol for the digital channel and to transmit the digital signal, wherein the digital signal comprises the AV data according to the protocol for the digital channel, the AV data comprising authentication information defined in the protocol for the digital channel, and the authentication information being used for a digital copy control scheme, and the copy control information specifies an analog copy control scheme to be applied to an analog signal including the AV data when the analog signal is decoded from the digital signal after the digital copy control scheme is applied to the digital signal in the reception device.

14. The transmission device of claim 13, wherein the digital channel is a digital interface according to a High Definition Multimedia Interface (HDMI) protocol.

15. The transmission device of claim 14, wherein the microprocessor directs the copy control information to be inserted into a data island period according to the HDMI protocol.

16. The transmission device of claim 13, wherein the digital channel is a digital interface according to a Digital Video Interface (DVI) protocol.

17. A reception device comprising:

a signal receiver to receive a digital signal comprising AV data from a transmission device through a digital channel, the AV data comprising authentication information defined in a protocol for the digital channel, the authentication information being used for a digital copy control scheme, and to perform an authentication process of the received digital signal using the authentication information;

a microprocessor to control copying of the AV data by extracting copy control information stored in a predetermined register as a result of the authentication process and referring to the extracted copy control information, the copy control information specifying an analog copy control scheme to be applied to an analog signal including the AV data when the authentication process is successfully performed and the analog signal is decoded from the digital signal; and a digital-to-analog (D/A) converter to convert the digital signal to an analog signal as a result of the authentication process, wherein the microprocessor generates a copy control signal for the analog signal by referring to the copy control information and directs the D/A converter to insert the copy control signal into the converted analog signal.

18. The reception device of claim 17, wherein the copy control signal for the analog signal is a signal according to a Copy Generation Management System (CGMS) protocol and/or a Macrovision protocol.

19. The reception device of claim 17, wherein the digital channel is a digital interface according to a High Definition Multimedia Interface (HDMI) protocol.

20. The reception device of claim 17, wherein the digital channel is a digital interface according to a Digital Video Interface (DVI) protocol.

* * * * *